US007280165B2

(12) United States Patent
Ryu et al.

(10) Patent No.: US 7,280,165 B2
(45) Date of Patent: Oct. 9, 2007

(54) APPARATUS AND METHOD FOR CONTROLLING CONVERGENCE OF PROJECTION TELEVISION

(75) Inventors: Il-gyeon Ryu, Suwon-si (KR); Jae-seung Shim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 509 days.

(21) Appl. No.: 10/865,791

(22) Filed: Jun. 14, 2004

(65) Prior Publication Data

US 2004/0252248 A1    Dec. 16, 2004

(30) Foreign Application Priority Data

Jun. 14, 2003  (KR) .................... 10-2003-0038518

(51) Int. Cl.
H04N 3/22    (2006.01)
H04N 3/223    (2006.01)
(52) U.S. Cl. ........................... 348/745; 348/747
(58) Field of Classification Search ........ 348/744–747, 348/806, 189, 191, 658; H04N 3/223, 9/28

See application file for complete search history.

(56) References Cited

U.S. PATENT DOCUMENTS 5,231,481 A * 7/1993 Eouzan et al. ............. 348/658
5,298,985 A * 3/1994 Tsujihara et al. ........... 348/745
6,061,102 A * 5/2000 Sheppard et al. ........... 348/745

FOREIGN PATENT DOCUMENTS

| JP | 07-336703 A | 12/1995 |
| JP | 08-331576 A | 12/1996 |
| JP | 10-117358 A | 5/1998 |
| KR | 1998-026700 A | 7/1998 |
| KR | 1999-0030304 U | 7/1999 |
| KR | 2001-0076975 A | 8/2001 |
| KR | 2002-0040454 A | 5/2002 |
| KR | 2002-0059540 A | 7/2002 |

* cited by examiner

Primary Examiner—Michael H. Lee
(74) Attorney, Agent, or Firm—Sughrue Mion Pllc.

(57) ABSTRACT

An apparatus and method for controlling a convergence of a projection television includes a pattern generator which generates R, G, and B video patterns used for controlling the convergence and then outputs the R, G, and B video patterns to a display, and a controller which compares position coordinates and luminance levels of the R, G, and B video patterns with position coordinates and luminance levels of reference R, G, and B video patterns to adjust the luminance levels of the R, G, and B video patterns to the luminance levels of the reference R, G, and B video patterns.

6 Claims, 4 Drawing Sheets

APPARATUS AND METHOD FOR CONTROLLING CONVERGENCE OF PROJECTION TELEVISION

BACKGROUND OF THE INVENTION

This application claims the priority of Korean Patent Application No. 2003-38518, filed on Jun. 14, 2003, in the Korean Intellectual Property Office, the disclosure of which is incorporated herein in its entirety by reference.

1. Field of the Invention

An apparatus and method consistent with the present invention relates to operating an image display device, and more particularly, to an apparatus and a method for controlling a convergence of a projection television in which video patterns used for controlling the convergence can be generated so as to allow the projection television to have an overall uniform luminance level, and luminance levels of the video patterns in random positions of the projection television can be freely controlled.

2. Description of the Related Art

A projection television includes R (red), G (green), and B (blue) cathode ray tubes (CRTs) which display R, G, and B color images to project the R, G, and B color images on a screen, respectively.

The R and B CRTs are biased toward both sides of the G CRT, respectively. Thus, biased R, G, and B color images are projected on the screen of the projection television. A convergence control operation is performed so that the R, G, and B CRTs output equal color luminance levels so as to improve the resolution of the screen.

FIG. 1 is a view for explaining a process of controlling a convergence of a conventional projection television. A screen 100-1 on which a video is displayed is installed on a front surface of a projection television 100. As shown in FIG. 2, video patterns used for the convergence are displayed on the screen 100-1. Although not shown in FIG. 2, the projection television 100 includes an image projector which emits R, G, and B beams, a reflective mirror which reflects the R, G, and B beams toward the screen 100-1, and a remote control receiver which receives convergence control signals. A controller 104 drives a transfer unit 101 to transfer the projection television 100 to an imaging position of a charge-coupled device (CCD) camera 102. A remote control transmitter 103 transmits signals for displaying the video patterns to the screen 100-1 of the projection television 100 in order to control the convergence. The CCD camera 102 images the video pattern displayed on the screen 100-1 of the projection television 100. The controller 104 determines, using predetermined reference video patterns, whether the convergence of the screen 100-1 of the projection television 100 is currently within an allowable error. If the convergence is not within the allowable error, the controller 104 compensates for an error in the convergence using an additional controlling device.

U.S. Pat. No. 5,614,792 discloses such a method of controlling a convergence.

As described above, in a projection television, R and B CRTs are biased toward both sides of a G CRT. Due to this structural problem, a reddish image is formed in the left portion of a screen and a bluish image is formed in the right portion of the screen during the control of the convergence of the projection television. Also, the luminance of a marginal portion of the screen is poorer than the luminance of a central portion of the screen.

Accordingly, during the process described with reference to FIG. 1, luminance levels of R, G, and B video patterns may be different on the marginal and central portions of the screen. As a result, an image classification rate of the CCD camera 102 may deteriorate.

SUMMARY OF THE INVENTION

Illustrative, non-limiting embodiments of the present invention overcome the above disadvantages and other disadvantages not described above. However, the present invention is not required to overcome the disadvantages described above, and thus, an illustrative, non-limiting embodiment of the present invention may not overcome any of the problems described above.

Accordingly, it is an aspect of the present invention to provide an apparatus and a method for controlling a convergence of a projection television in which video patterns used for the convergence can be generated to allow the projection television to have an overall uniform luminance level so as to improve an image classification rate of a CCD camera.

Another aspect of the present invention provides an apparatus and method for controlling a convergence of a projection television in which luminance levels of video patterns in random positions of a screen of the projection television can be freely controlled.

Additional aspects and advantages of the invention will be set forth in part in the description which follows and, in part, will be understood from the description, or may be learned by practice of the invention.

The foregoing and other aspects of the present invention are achieved by providing an apparatus for controlling a convergence of a projection television which comprises a pattern generator which generates R, G, and B video patterns used for controlling the convergence and then outputs the R, G, and B video patterns to a display, and a controller which compares position coordinates and luminance levels of the R, G, and B video patterns with position coordinates and luminance levels of reference R, G, and B video patterns to adjust the luminance levels of the R, G, and B video patterns to the luminance levels of the reference R, G, and B video patterns.

There may also be provided a method of controlling a convergence of a projection television which comprises generating R, G, and B video patterns used for the convergence and then outputting the R, G, and B video patterns to a display; comparing position coordinates and luminance levels of the R, G, and B video patterns with position coordinates and luminance levels of reference R, G, and B video patterns; adjusting the luminance levels of the R, G, and B video patterns to the luminance levels of the reference R, G, and B video patterns based on the comparison result and then outputting the R, G, and B video patterns with the adjusted luminance levels; and converting the luminance levels of the R, G, and B video patterns into analog luminance levels of the R, G, and B video patterns and then switching the R, G, and B video patterns to the analog luminance levels of the R, G, and B video patterns.

There may also be provided an apparatus for controlling a convergence of a projection television which comprises a pattern generator which generates R, G, and B video patterns and then outputting the R, G, and B video patterns to a display, and a controller which receives position coordinates and luminance levels of reference R, G, and B video patterns, detects the position coordinates of the reference R, G, and B video patterns using input horizontal and vertical sync signals, and adjusts the luminance levels of the R, G, and B video patterns on the detected position coordinates to the luminance levels of the reference R, G, and B video patterns. A digital-to-analog converter converts the luminance levels of the R, G, and B video patterns output from the controller into analog luminance levels of the R, G, and B video patterns. A switching unit switches the R, G, and B video patterns output from the pattern generator 300 to the analog luminance levels of the R, G, and B video patterns output from the digital-to-analog converter.

Still further, there may be provided a method of controlling a convergence of a projection television which comprises generating R, G, and B video patterns used for the convergence and then outputting the R, G, and B video patterns to a display; receiving position coordinates and luminance levels of reference R, G, and B video patterns; detecting the position coordinates of the reference R, G, and B video patterns using input horizontal and vertical sync signals and adjusting the luminance levels of the R, G, and B video patterns on the detected position coordinates to the luminance levels of the reference R, G, and B video patterns; and converting the luminance levels of the R, G, and B video patterns into analog luminance levels of the R, G, and B video patterns and then switching the R, G, and B video patterns to the analog luminance levels of the R, G, and B video patterns.

BRIEF DESCRIPTION OF THE DRAWINGS

The above and other features and advantages of the present invention will become more apparent and more readily appreciated from the following description of the illustrative, non-limiting embodiments taken in conjunction with the attached drawings, in which.

DETAILED DESCRIPTION OF THE INVENTION

Figure 1:
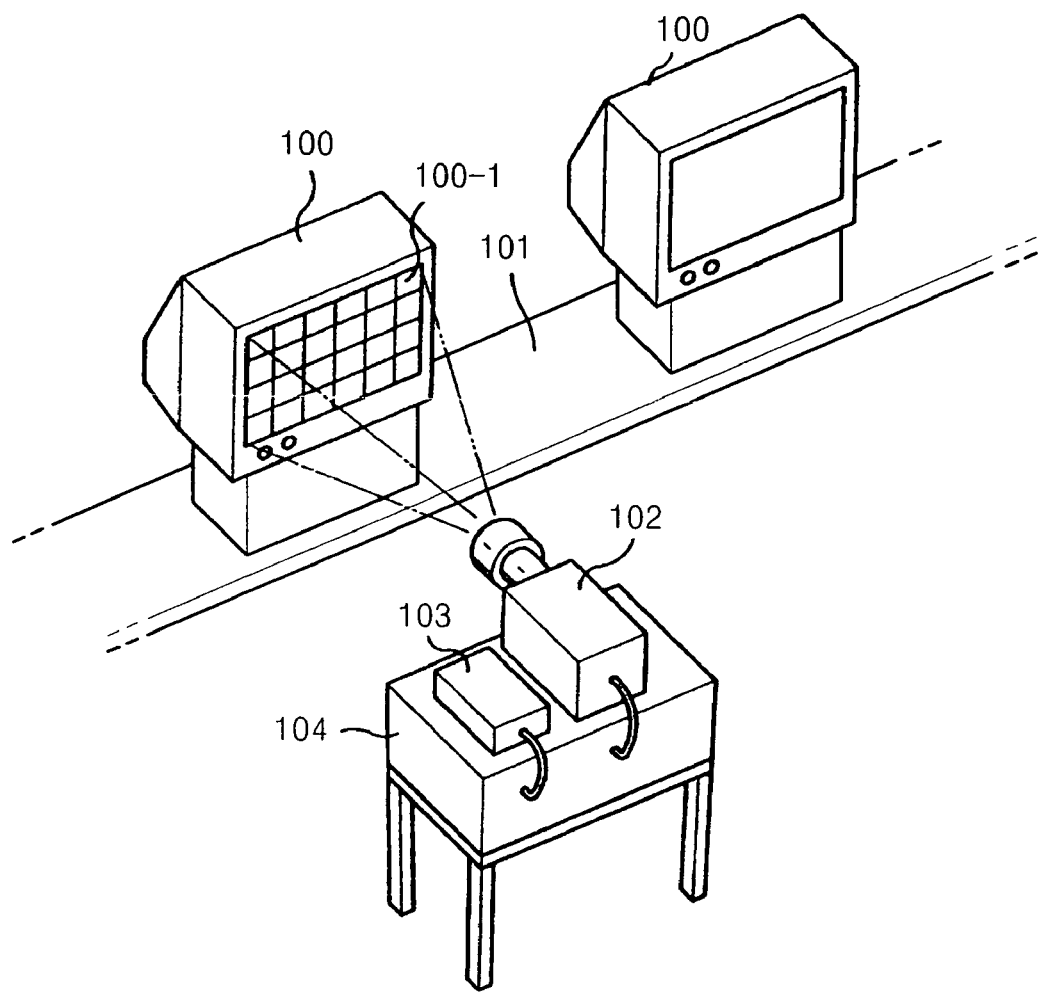
FIG. 1 is a view for explaining a process of controlling a convergence of a conventional projection television.

Reference will now be made in detail to the illustrative, non-limiting embodiments of the present invention, examples of which are illustrated in the attached drawings wherein like reference numerals refer to like elements throughout. The exemplary embodiments are described below in order to explain the present invention by referring to the figures.

Figure 3:
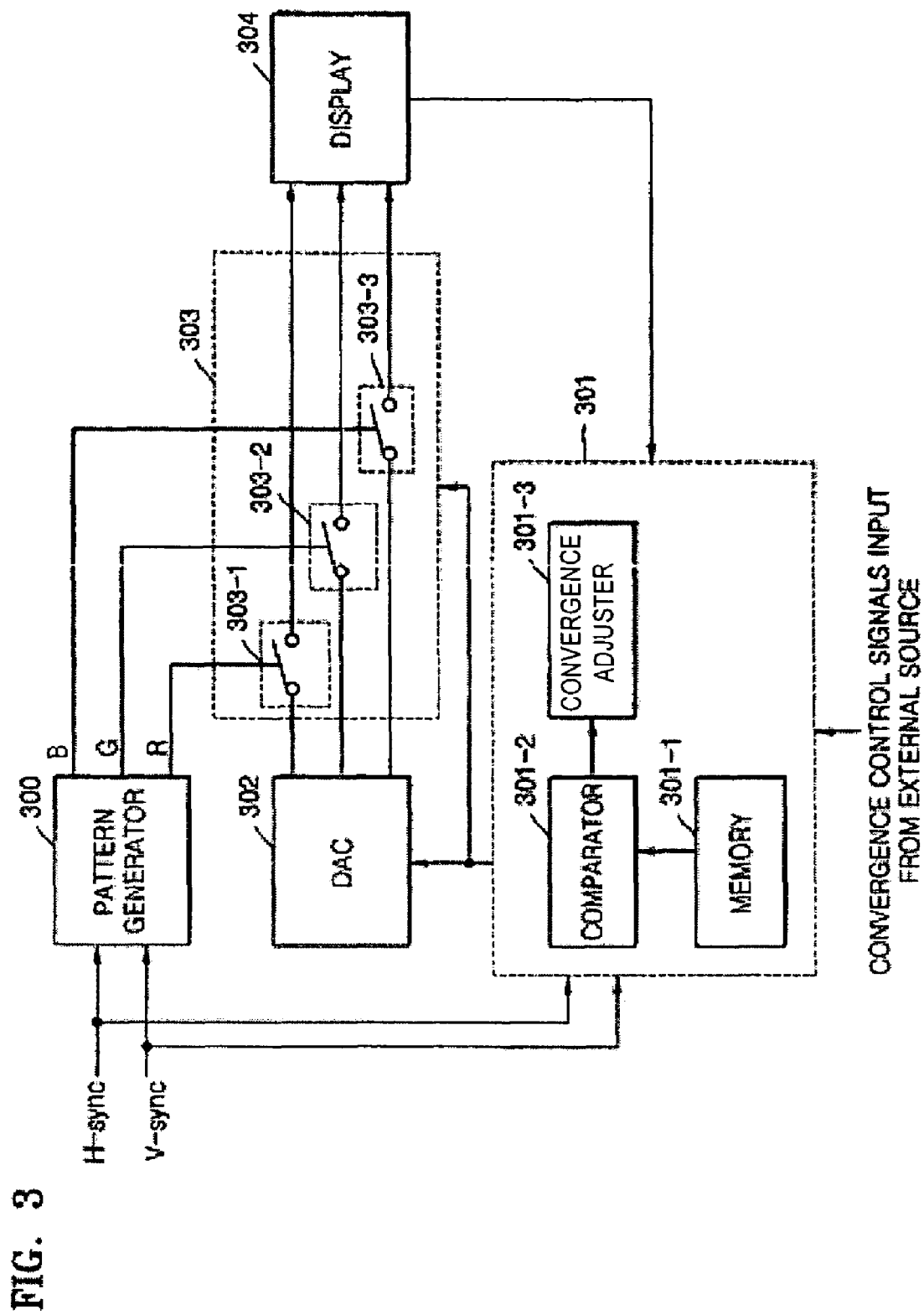
FIG. 3 is a block diagram of an apparatus for controlling a convergence of a projection television, according to the present invention.

FIG. 3 is a block diagram of an apparatus for controlling a convergence of a projection television, according to the present invention. Referring to FIG. 3, the apparatus includes a pattern generator 300, a controller 301, a digital-to-analog converter (DAC) 302, a switching unit 303, and a display 304. The controller 301 includes a memory 301-1, a comparator 301-2, and a convergence adjuster 301-3. The switching unit 303 includes first, second, and third switches 303-1, 303-2, and 303-3.

Figure 4:
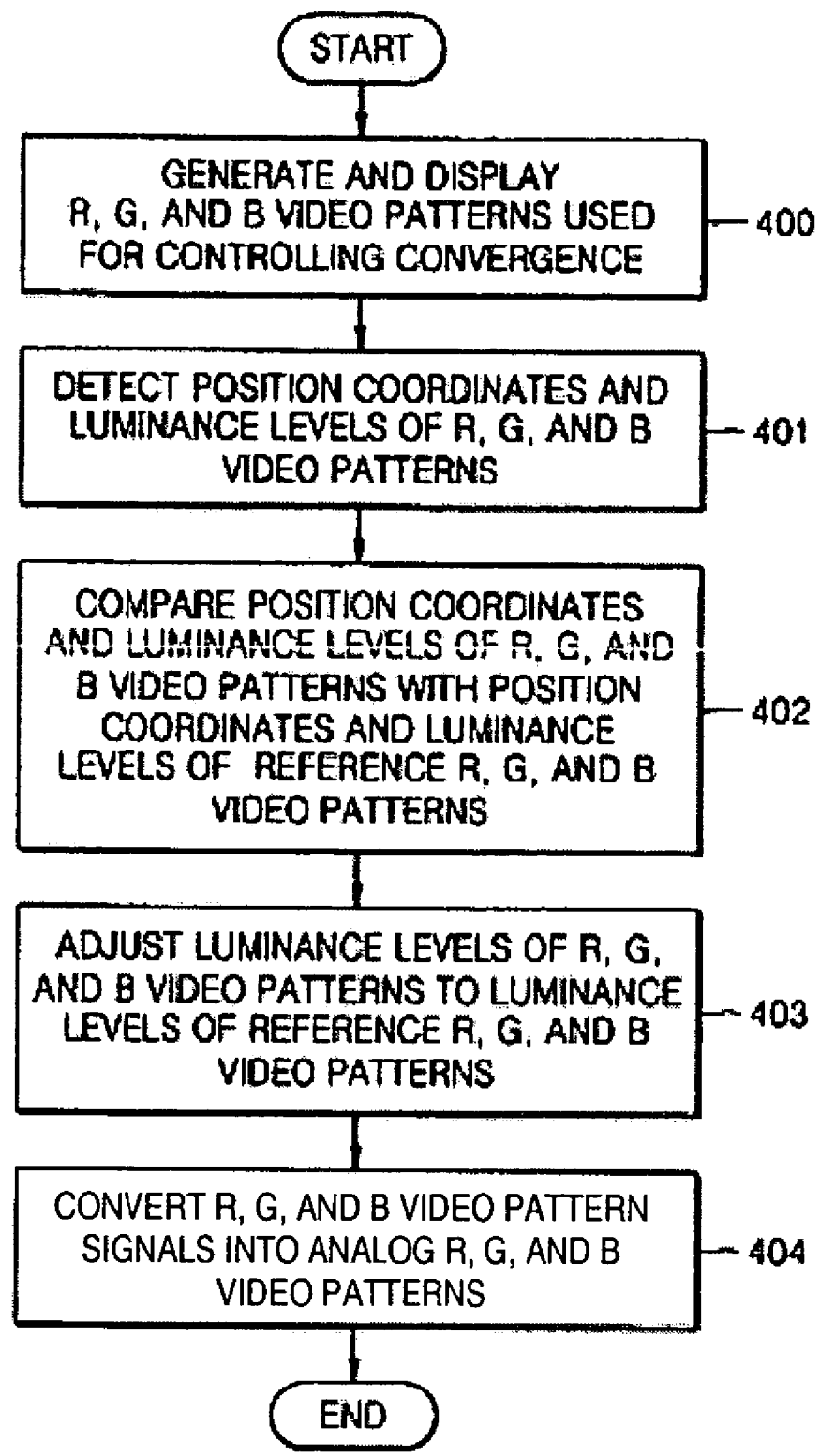
FIG. 4 is a flowchart for explaining a process of generating video patterns used for controlling a convergence so as to allow a projection television to have an overall uniform luminance level, in a method of controlling the convergence of the projection television, according to the present invention.

FIG. 4 is a flowchart for explaining a process of generating video patterns used for controlling a convergence of a projection television so as to allow the projection television to have an overall uniform luminance level, in a method of controlling the convergence of the projection television, according to the present invention.

Figure 2:
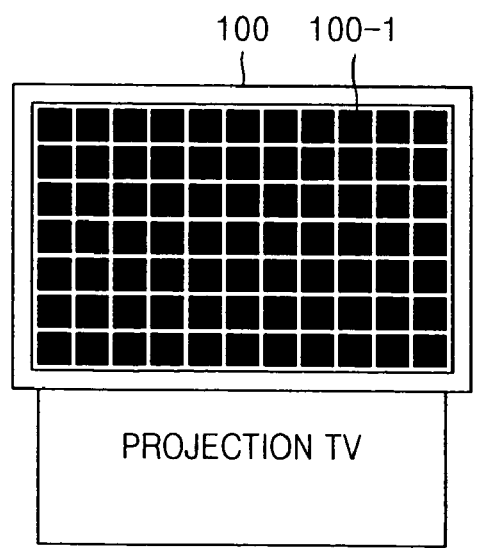
FIG. 2 is a view showing video patterns used for controlling a convergence.

Hereinafter, a process of generating video patterns used for controlling a convergence of a projection television will be described in detail with reference to FIGS. 2 through 4.

First, an apparatus for controlling a convergence to allow a projection television to have an overall uniform luminance level will be explained with reference to FIGS. 2 and 3.

The pattern generator 300 generates R, G, and B video patterns using input horizontal and vertical sync signals and displays the R, G, and B video patterns on the display 304. For example, the pattern generator 300 generates and displays the video patterns of FIG. 2. A reddish image is formed in the left portion of the display 304 and a bluish image is formed in the right portion of the display 304. Also, the luminance of a marginal portion of the display 304 is poorer than the luminance of a central portion of the display 304.

The controller 301 compares position coordinates and luminance levels of the R, G, and B video patterns displayed on the display 304 with position coordinates and luminance levels of reference R, G, and B video patterns to adjust the luminance levels of the R, G, and B video patterns to the luminance levels of the reference R, G, and B video patterns.

The memory 301-1 stores the position coordinates and luminance levels of the reference R, G, and B video patterns.

The comparator 301-2 compares the position coordinates and luminance levels of the R, G, and B video patterns displayed on the display 304 with the position coordinates and luminance levels of the reference R, G, and B video patterns.

The convergence adjuster 301-3 outputs the luminance levels of the R, G, and B video patterns, the luminance levels of which are adjusted based on the comparison result. If the position coordinates and luminance levels of the R, G, and B video patterns are different from the position coordinates and luminance levels of the reference R, G, and B video patterns, the convergence adjuster 301-3 adjusts the luminance levels of the R, G, and B video patterns in current positions to the luminance levels of the reference R, G, and B video patterns.

For example, since the reddish image is formed in the left portion of the display 304, a luminance level of the right portion of the R video pattern is lower than the luminance level of the reference R video pattern stored in the memory 301-1. A luminance level of the left portion of the R video pattern is higher than the luminance level of the reference R video pattern. Therefore, the convergence adjuster 301-3 detects a position of the R video pattern, the luminance level of which is to be adjusted, using the input horizontal and vertical sync signals. Next, the convergence adjuster 301-3 adjusts the luminance level of the R video pattern in the detected position to the luminance level of the reference R video pattern and then outputs the R video pattern.

Also, since the luminance of the marginal portion of the display 304 is poorer than the luminance of the central portion of the display 304, a luminance level of a marginal portion of the G video pattern is lower than the luminance level of the reference G video pattern. Also, a luminance level of a central portion of the G video pattern is higher than the luminance level of the reference G video pattern. Thus, the convergence adjuster 301-3 detects a position of the G video pattern, the luminance level of which is to be adjusted, using the input horizontal and vertical sync signals. Next, the convergence adjuster 301-3 adjusts the luminance level of the G video pattern to the luminance pattern of the reference G video pattern and then outputs the G video pattern.

Moreover, since the bluish image is formed in the right portion of the display 304, a luminance level of the left portion of the B video pattern is lower than the luminance level of the reference B video pattern. Also, a luminance level of the right portion of the B video pattern is higher than the luminance level of the reference B video pattern. Thus, the convergence adjuster 301-3 detects a position of the B video pattern, the luminance level of which is to be adjusted, using the input horizontal and vertical sync signals. Next, the convergence adjuster 301-3 adjusts the luminance level of the B video pattern to the luminance level of the reference B video pattern and then outputs the B video pattern.

The DAC 302 converts the luminance levels of the R, G, and B video patterns output from the controller 301 into analog luminance levels of the R, G, and B video patterns.

The switching unit 303 switches the R, G, and B video patterns output from the pattern generator 300 to the analog luminance levels of the R, G, and B video patterns output from the DAC 302. The controller 301 outputs a switch control signal to the switching unit 303. The first switch 303-1 switches the R video pattern output from the pattern generator 300 to the analog luminance levels of the R video pattern output from the DAC 302. The second switch 303-2 switches the G video pattern output from the pattern generator 300 to the analog luminance levels of the G video pattern output from the DAC 302. The third switch 303-3 switches the B video pattern output from the pattern generator 300 to the analog luminance levels of the B video pattern output from the DAC 302.

The display 304 displays a video pattern with an overall uniform luminance level due to the control of luminance levels by the controller 301.

A method of controlling a convergence to allow a projection television to have an overall uniform luminance level will now be described with reference to FIG. 4.

In step 400, the pattern generator 300 generates the R, G, and B video patterns used for controlling a convergence using the input horizontal and vertical sync signals and outputs the R, G, and B video patterns to the display 304.

In step 401, the controller 301 detects the position coordinates and luminance levels of the R, G, and B video patterns. Here, the reddish image is formed in the left portion of the display 304, the bluish image is formed in the right portion of the display 304, and the luminance of the marginal portion of the display 304 is poorer than the luminance of the central portion of the display 304.

In step 402, the controller 301 compares the position coordinates and luminance levels of the R, G, and B video patterns with the position coordinates and luminance levels of the reference R, G, and B video patterns.

In step 403, the controller 301 adjusts the luminance levels of the R, G, and B video patterns on the detected position coordinates to the luminance levels of the reference R, G, and B video patterns, based on the comparison result.

Since the reddish image is formed in the left portion of the display 304, the luminance level of the right portion of the R video pattern is lower than the luminance level of the reference R video pattern and the luminance level of the left portion of the R video pattern is higher than the luminance level of the reference R video pattern. Thus, the controller 301 detects the position of the R video pattern, the luminance of which is to be adjusted, using the input horizontal and vertical sync signals, adjusts the luminance level of the R video pattern in the detected position to the luminance level of the reference R video pattern, and outputs the R video pattern.

Since the luminance of the marginal portion of the display 304 is poorer than the luminance of the central portion of the display 304, the luminance level of the marginal portion of the G video pattern is lower than the luminance level of the reference G video pattern and the luminance level of the central portion of the G video pattern is higher than the luminance level of the reference G video pattern. Thus, the controller 301 detects the position of the G video pattern, the luminance level of which is to be adjusted, using the input horizontal and vertical sync signals, adjusts the luminance level of the G video pattern in the detected position to the luminance level of the reference G video pattern, and outputs the G video pattern.

Since the bluish image is formed in the right portion of the display 304, the luminance level of the left portion of the B video pattern is lower than the luminance level of the reference B video pattern and the luminance level of the right portion of the B video pattern is higher than the luminance level of the reference B video pattern. Thus, the controller 301 detects the position of the B video pattern, the luminance level of which is to be adjusted, using the input horizontal and vertical sync signals, adjusts the luminance level of the B video pattern in the detected position to the luminance level of the reference B video pattern, and outputs the B video pattern.

In step 404, the DAC 302 converts the luminance levels of the R, G, and B video patterns output from the controller 301 into the analog luminance levels of the R, G, and B video patterns, and the switching unit 303 switches the R, G, and B video patterns output from the pattern generator 300 to the analog luminance levels of the R, G, and B video patterns output from the DAC 302. The first switch 303-1 switches the R video pattern output from the pattern generator 300 to the analog luminance levels of the R video pattern output from the DAC 302. The second switch 303-2 switches the G video pattern output from the pattern generator 300 to the analog luminance levels of the G video pattern output from the DAC 302. The third switch 303-3 switches the B video pattern output from the pattern generator 300 to the analog luminance levels of the B video pattern output from the DAC 302. Accordingly, the video patterns used for controlling the convergence of the projection television can be generated so as to allow the projection television to have an overall uniform luminance level.

Figure 5:
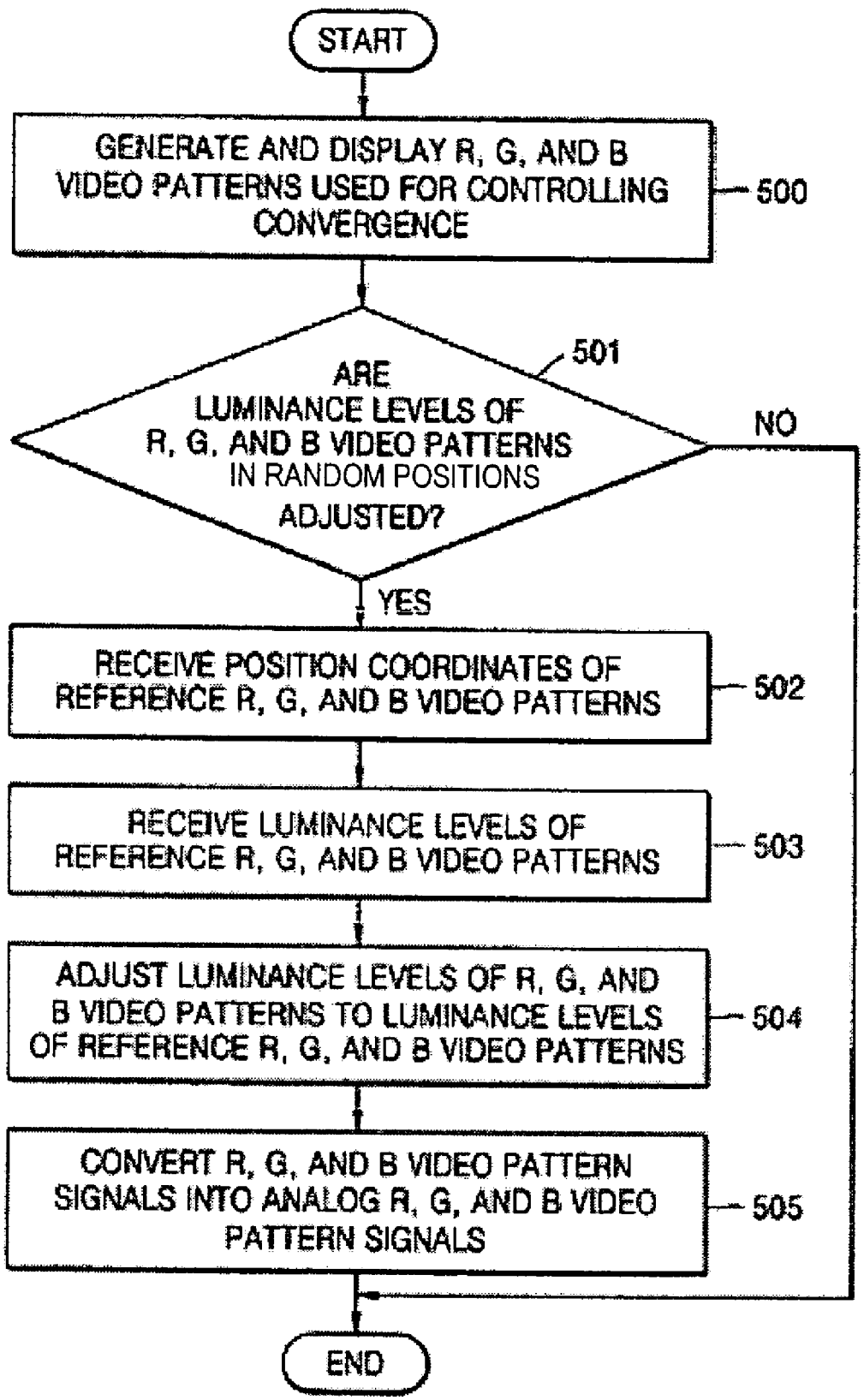
FIG. 5 is a flowchart for explaining a process of freely controlling luminance levels of video patterns in random positions of the projection television, in the method of controlling the convergence of the projection television.

FIG. 5 is a flowchart for explaining a process of freely controlling luminance levels of video patterns in random positions of a projection television, in the method of controlling the convergence of the projection television. Referring to FIG. 5 together with FIGS. 2 and 3, in step 500, the pattern generator 300 generates the R, G, and B video patterns used for the convergence using the input horizontal and vertical sync signals and outputs the R, G, and B video patterns to the display 304.

In step 501, the controller 301 determines whether the luminance levels of the R, G, and B video patterns are adjusted. For example, the reddish image is formed in the left portion of the display 304, the bluish image is formed in the right portion of the display 304, and the luminance of the marginal portion of the display 304 is poorer than the luminance of the central portion of the display 304.

If the controller 31 determines to adjust the luminance levels of R, G, and B video patterns, in step 502, the controller 301 receives position coordinates of reference R, G, and B video patterns (convergence control signals from an external source). Here, the controller 301 detects the received position coordinates using the input horizontal and vertical sync signals.

In step 503, the controller 301 receives luminance levels of reference R, G, and B video patterns for the detected position coordinates.

In step 504, the controller 301 adjusts the luminance levels of the R, G, and B video patterns on the detected position coordinates to the luminance levels of the reference R, G, and B video patterns.

For example, since the reddish image is formed in the left portion of the display 304, the controller 301 receives a predetermined value (position coordinate and luminance level) higher than the luminance level of the right portion of the R video pattern or a predetermined value (position coordinate and luminance level) lower than the luminance level of the left portion of the R video pattern. The controller 301 detects the position of the R video pattern using the input horizontal and vertical sync signals, adjusts the luminance level of the R video pattern on the detected position to the luminance level of the reference R video pattern, and outputs the R video pattern with the adjusted luminance level.

Since the luminance of the marginal portion of the display 304 is poorer than the luminance of the central portion of the display 304, the controller 301 receives a predetermined value (position coordinate and luminance level) higher than the luminance level of the marginal portion of the G video pattern or a predetermined value (position coordinate and luminance level) lower than the luminance level of the central portion of the G video pattern. The controller 301 detects the position of the G video pattern using the input horizontal and vertical sync signals, adjusts the luminance level of the G video pattern on the detected position to the luminance level of the reference G video pattern, and outputs the G video pattern with the adjusted luminance level.

Also, since the bluish image is formed in the right portion of the display 304, the controller 301 receives a predetermined value (position coordinate and luminance level) higher than the luminance level of the left portion of the B video pattern or a predetermined value (position coordinate and luminance level) lower than the luminance level of the right portion of the B video pattern. The controller 301 detects the position of the B video pattern using the input horizontal and vertical sync signals, adjusts the luminance level of the B video pattern on the detected position to the luminance level of the reference B video pattern, and outputs the B video pattern with the adjusted luminance level.

In step 505, the DAC 302 converts the luminance levels of the R, G, and B video patterns output from the controller 301 into the analog luminance levels of the R, G, and B video patterns, and the switching unit 303 switches the R, G, and B video patterns output from the pattern generator 300 to the analog luminance levels of the R, G, and B video patterns output from the DAC 302. The first switch 303-1 switches the R video pattern output from the pattern generator 300 to the analog luminance levels of the R video pattern output from the DAC 302. The second switch 303-2 switches the G video pattern output from the pattern generator 300 to the analog luminance levels of the G video pattern output from the DAC 302. The third switch 303-3 switches the B video pattern output from the pattern generator 300 to the analog luminance levels of the B video pattern output from the DAC 302. Accordingly, the luminance levels of the video patterns displayed on the projection television can be freely controlled in random positions.

As described above, according to the present invention, video patterns used for controlling a convergence of a projection television can be generated so as to allow the projection television to have an overall uniform luminance level. As a result, an image classification rate of a camera can be improved during the control of the convergence. Also, the luminance levels of video patterns can be freely controlled in random positions.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling a convergence of a projection television, comprising:
   a pattern generator which generates R, G, and B video patterns used for controlling the convergence and then outputs the R, G, and B video patterns to a display;
   a controller which compares position coordinates and luminance levels of the R, G, and B video patterns with position coordinates and luminance levels of reference R, G, and B video patterns to adjust the luminance levels of the R, G, and B video patterns to the luminance levels of the reference R, G, and B video levels;
   a digital-to-analog converter which converts the R, G, and B video pattern signals output from the controller into analog R, G, and B video pattern signals; and
   a switching unit which switches the luminance levels of the R, G, and B video patterns to the luminance levels of the analog R, G, and B video pattern signals.

2. The apparatus of claim 1, wherein the switching unit comprises:
   a first switch which switches the luminance level of the R video pattern to the luminance level of the analog R video pattern;
   a second switch which switches the luminance level of the G video pattern to the luminance level of the analog G video pattern; and
   a third switch which switches the luminance level of the B video pattern to the luminance level of the analog B video pattern.

3. The apparatus of claim 1, wherein controller comprises:
   a memory which stores position coordinates and luminance levels of reference R, G, and B video patterns;
   a comparator which compares the position coordinates and luminance levels of the R, G, and B video patterns with the position coordinates and luminance levels of the reference R, G, and B video patterns; and
   a convergence adjuster which adjusts the luminance levels of the R, G, and B video patterns to the luminance levels of the reference R, G, and B video patterns, based on the comparison result.

4. An apparatus for controlling a convergence of a projection television, comprising:
   a pattern generator which generates R, G, and B video patterns and then outputting the R, G, and B video patterns to a display;
   a controller which receives position coordinates and luminance levels of reference R, G, and B video patterns, detects the position coordinates of the reference R, G, and B video patterns using input horizontal and vertical sync signals, and adjusts the luminance levels of the R, G, and B video patterns on the detected position coordinates to the luminance levels of the reference R, G, and B video patterns;

a digital-to-analog converter which converts the R, G, and V video pattern signals output from the controller into analog R, G, and B video pattern signals; and a switching unit which switches the luminance levels of the R, G, and B video patterns to the luminance levels of the analog R, G, and B video pattern signals.

5. The apparatus of claim 4, wherein the switching unit comprises:

a first switch which switches the R video pattern signal to the analog R video pattern signal;

a second switch which switches the G video pattern signal to the analog G video pattern signal; and a third switch which switches the B video pattern signal to the analog B video pattern signal.

6. A method of controlling a convergence of a projection television, comprising:

generating R, G, and B video patterns used for the convergence and then outputting the R, G, and B video patterns to a display;

receiving position coordinates and luminance levels of reference R, G, and B video patterns;

detecting the position coordinates of the reference R, G, and B video patterns using input horizontal and vertical sync signals and adjusting the luminance levels of the R, G, and B video patterns on the detected position coordinates to the luminance levels of the reference R, G, and B video patterns; and converting the R, G, and B video pattern signals into analog R, G, and B video pattern signals and then switching the R, G, and B video pattern signals to the analog R, G, and B video pattern signals.

* * * * *